United States Patent
Shanker et al.

(10) Patent No.: US 9,563,908 B2
(45) Date of Patent: Feb. 7, 2017

(54) TRANSACTION PROCESSING CIRCUIT

(75) Inventors: Naresh Kumar Shanker, Menlo Park, CA (US); Sharad Mathur, Belmont, CA (US); William Stevenson, Eugene, OR (US)

(73) Assignee: QUALCOMM Incorporated, San Diego, CA (US)

( * ) Notice: Subject to any disclaimer, the term of this patent is extended or adjusted under 35 U.S.C. 154(b) by 1331 days.

(21) Appl. No.: 12/895,191

(22) Filed: Sep. 30, 2010

(65) Prior Publication Data

US 2012/0084183 A1    Apr. 5, 2012

(51) Int. Cl.
*G06Q 30/06* (2012.01)
*G06Q 40/00* (2012.01)

(52) U.S. Cl.
CPC .......... *G06Q 30/0601* (2013.01); *G06Q 40/00* (2013.01); *G06Q 40/12* (2013.12)

(58) Field of Classification Search
CPC ............................... G06Q 10/00; G06Q 30/00
USPC .................... 705/27.1, 39; 717/101
See application file for complete search history.

(56) References Cited

U.S. PATENT DOCUMENTS

| 5,870,722 A * | 2/1999 | Albert et al. ............ 705/39 |
| 2004/0010499 A1* | 1/2004 | Ghosh et al. ............ 707/100 |
| 2011/0196761 A1* | 8/2011 | Callahan et al. ........ 705/27.1 |

* cited by examiner

*Primary Examiner* — Rokib Masud
(74) *Attorney, Agent, or Firm* — Norton Rose Fulbright US LLP

(57) ABSTRACT

According to one exemplary embodiment, a system for processing transactions is provided that comprises a transaction processing circuit configured to receive transaction data relating to one or more transactions for the purchase of software applications from a digital application store. The transaction processing circuit is further configured to apply one or more business rules to the transaction data and to generate one or more transaction summary files. The transaction summary files are transmitted to a payment system configured to perform, based on the transaction summary files, at least one of recording revenue related to the transactions and causing payment to be distributed to developers of the software applications. At least a portion of the transaction processing circuit is implemented using a shared, scalable computing system. A level of resources of the shared, scalable computing system requested for implementation of the transaction processing circuit is varied based on a volume of transactions processed by the transaction processing system.

20 Claims, 7 Drawing Sheets

TRANSACTION PROCESSING CIRCUIT

BACKGROUND

The present application relates generally to systems and methods for processing transactions. According to various exemplary embodiments, the present disclosure relates to processing transactions (e.g., micro payment transactions) made using mobile computing devices.

SUMMARY

According to one exemplary embodiment of the present disclosure, a system for processing transactions comprises a transaction processing circuit configured to receive transaction data relating to one or more transactions for the purchase of software applications from a digital application store. The transaction processing circuit is further configured to apply one or more business rules to the transaction data and to generate one or more transaction summary files. The transaction summary files are transmitted to a payment system configured to perform, based on the transaction summary files, at least one of recording revenue related to the transactions and causing payment to be distributed to developers of the software applications. At least a portion of the transaction processing circuit is implemented using a shared, scalable computing system. A level of resources of the shared, scalable computing system requested for implementation of the transaction processing circuit is varied based on a volume of transactions processed by the transaction processing system.

According to another exemplary embodiment, a method of processing transactions comprises receiving, at a transaction processing circuit, transaction data relating to one or more transactions for the purchase of software applications from a digital application store. The method further comprises applying, using the transaction processing circuit, one or more business rules to the transaction data. The method further comprises generating, using the transaction processing circuit, one or more transaction summary files. The transaction summary files are transmitted to a payment system configured to perform, based on the transaction summary files, at least one of recording revenue related to the transactions and causing payment to be distributed to developers of the software applications. At least a portion of the transaction processing circuit is implemented using a shared, scalable computing system. A level of resources of the shared, scalable computing system requested for implementation of the transaction processing circuit is varied based on a volume of transactions processed by the transaction processing system.

According to yet another exemplary embodiment, one or more non-transitory computer-readable media configured to store machine-executable instructions are executable by one or more processors to implement a method comprising receiving, at a transaction processing circuit, purchase data relating to one or more transactions for the purchase of software applications from an application store. The purchase data is received from a digital application catalog or store. The purchase data represents purchases made from the application catalog in relation to the one or more transactions. The transaction processing circuit is implemented using a shared, scalable computing system. A level of resources of the shared, scalable computing system requested for implementation of the transaction processing circuit is varied based on a volume of transactions processed by the transaction processing system. The method further comprises receiving, at the transaction processing circuit, payment data representing payments received in relation to the one or more transactions. The payment data is received from a payment provider that collects payments for the transactions. The method further comprises grouping, using a master node of the transaction processing circuit, the one or more transactions into one or more transaction batches. The method further comprises, for each transaction batch, confirming, using one or more worker nodes of the transaction processing circuit, that the purchase data is consistent with the payment data. The one or more worker nodes are implemented using resources of the shared, scalable computing system that are allocated based at least in part on a volume of transactions being processed by the transaction processing circuit. The method further comprises generating, using the transaction processing circuit, one or more transaction summary files. The transaction summary files are transmitted to a payment system configured to perform, based on the transaction summary files, at least one of recording revenue related to the transactions and causing payment to be distributed to developers of the software applications.

DETAILED DESCRIPTION OF EXEMPLARY EMBODIMENTS

Referring generally to the figures, systems and methods for processing transactions are described according to various exemplary embodiments. In some embodiments, systems and/or methods may be related to purchases made (e.g., Over the Air (OTA)) on a mobile and/or handheld computing device, such as a cellular phone or smartphone. In one embodiment, transactions may be for the purchase of software applications that may be operated on the mobile computing device. In other embodiments, transactions may be for the purchase of media files, such as audio (e.g., music) and/or video (e.g., movie) files. In still further embodiments, other types of transactions may be processed using the systems and/or methods described herein. While various embodiments disclosed herein are described with reference to transactions for software applications, it should be appreciated that the subject of the transactions may be any product and/or service. In some embodiments, a transaction processing system or circuit (e.g., a front-end system) may be provided that is configured to interface with a payment system and work in conjunction with the payment system to process transactions. Various embodiments support multiple payment types (e.g., credit cards, debit cards, invoice accounts, etc.) and/or payment methods (e.g., payment gateways, operator or service provider billing methods, online payment providers, etc.). Various embodiments also provide for reconciliation and/or reporting of data to developers and consumers.

One or more embodiments described herein may provide for efficient processing of a high volume of low value (e.g., inexpensive) transactions. For example, one or more embodiments described herein may provide for processing of a high volume of transactions (e.g., more than one thousand per day, more than ten thousand per day, etc.) for software applications where various software applications may each cost a small amount of money (e.g., $0.99, $1.00, $1.99, $2.00, $2.99, less than $3.00, etc.). One or more embodiments may provide a system that is capable of interfacing with multiple different product and/or service providers (e.g., software developers). One or more embodiments may provide a system that is capable of handling multiple different payment types, currency types, etc. One or more embodiments may provide a system that handles at least a portion of a process for managing transactions such that the complexity, cost, etc. of a payment processing system may be reduced. One or more embodiments may provide a system that can flexibly scale to increasing or decreasing processing power and/or data storage needs, which may result in cost savings.

Figure 1:
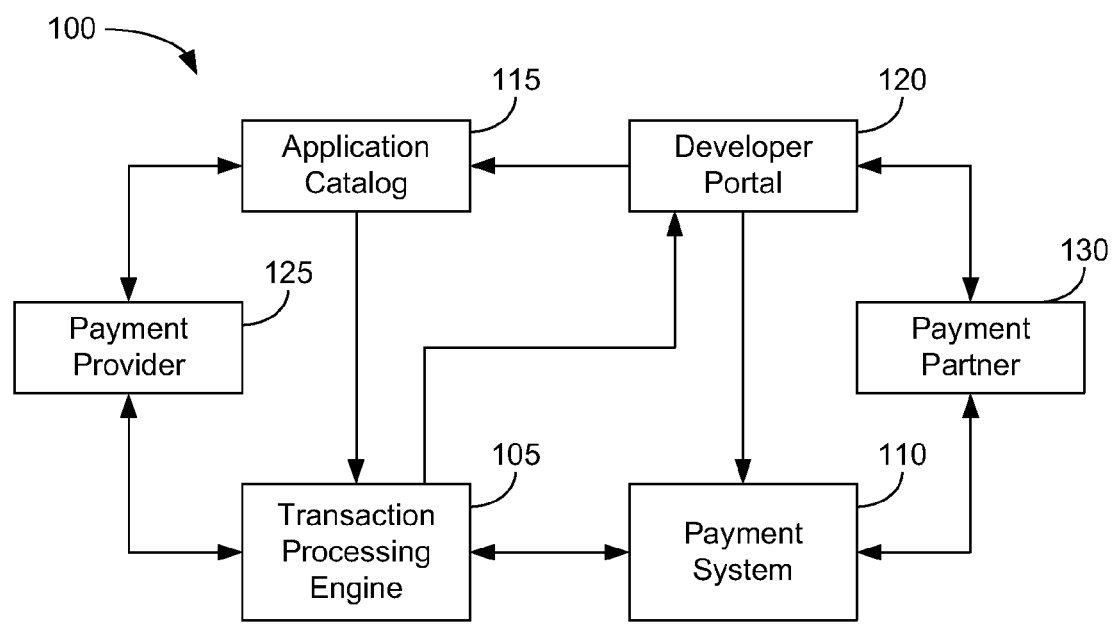
FIG. 1 is a block diagram of a system for processing transactions according to an exemplary embodiment.

Referring first to FIG. 1, a block diagram of a transaction system 100 for processing transactions is shown according to an exemplary embodiment. Transaction system 100 may include a transaction processing circuit 105 configured to receive data related to requested transactions and process the transactions. The transactions may be for the purchase of software applications from an application store. Transaction processing circuit 105 may receive data from and/or send data to a payment system 110, an application catalog 115, a developer portal 120, a payment provider 125, etc. in the course of processing transactions. In various embodiments, transaction system 100 and/or transaction processing circuit 105 may be implemented using instructions stored on one or more computer-readable media (e.g., memories, databases, etc.) and executed by one or more processors (e.g., server computers). In some embodiments (e.g., the exemplary embodiment described herein with reference to FIG. 3), transaction system 100 and/or transaction processing circuit 105 may be implemented in a cloud computing environment. Transaction processing circuit 105 is configured to process transactions for the purchase of software applications. The software applications on which the transactions are based may be produced by one or more developers that communicate with system 100 through a developer portal 120. Developer portal 120 may be used by developers to market software applications in the application store. In some embodiments, the software applications may be developed for a particular device or set of devices (e.g., Palm Pre, Palm Pixi, etc.), operating system (e.g., Palm WebOS), etc. In some embodiments, developers may be given access through developer portal 120 to one or more software development kits (SDKs) that may be used to develop applications for one or more platforms. In some embodiments, developer portal 120 may provide an interface for developers to upload software applications (e.g., new applications) for sale in the application store and/or information about the software applications.

In some embodiments, developers may be required to pay a fee to market applications in the application store and/or to gain access to an SDK. The fee may be a membership fee (annual fee, quarterly fee, monthly fee, etc.), one-time fee, etc. In such embodiments, developer portal 120 may provide an interface for developers to pay the fees. The fee payment (e.g., initial fee payment, membership renewal, etc.) may be submitted through developer portal 120 to a payment partner 130 (e.g., Paypal, etc.) that may process the payment.

Each developer may receive payments related to the purchase of the developer's applications in the application store. In some embodiments, the payments may be fixed payments (e.g., daily, weekly, monthly, based on number of applications in the application store, based on popularity and/or complexity of applications, etc.). In other embodiments, the payments may be related to the number and/or type of applications developed by the developer that were sold in the application store. In some embodiments, the payments may be proportional to the gross revenue, net profits, etc. generated by the sales of the developer's applications. For example, a developer may be paid a portion of the total revenue generated by the sales of its applications based on the nature of the contractual relationship with the developer. In some embodiments, the portion or percentage of the revenue generated by different applications that is paid to different developers may be the same for all developers. In some embodiments, the portion of the revenue and/or profits paid may vary for different developers and/or applications. For example, a first developer may receive a first percentage of the revenue generated by its applications and a second developer may a second percentage of the revenue generated by its applications. In another example, a developer may receive a first percentage of the revenue generated by sales of a first application and a second percentage of the revenue generated by sales of a second application (e.g., based on the category of the application, popularity of the application, etc.). In some embodiments, revenue produced by an application may be shared among the developer of the application and the host of the application store. In other embodiments, other parties may also share in the revenue produced by an application, such as a service provider. In some embodiments, the number and/or type of parties sharing revenue and/or the percentage of revenue shared may change over time (e.g., based on changes in contractual agreements). In some embodiments, only transactions related to paid applications may be processed by system 100 (e.g., applications offered in the application store at no cost to a consumer may not be handled by system 100).

An application catalog 115 may be configured to receive information relating to the applications from developer portal 120 and publish applications available for purchase from the application store. Application catalog 115 may include a directory of all applications available for purchase through the application store. In some embodiments, the directory of applications may be reviewable and/or searchable by a consumer in a variety of different ways, such as by name, category (e.g., productivity, travel, games, etc.), developer, rating (e.g., critic and/or consumer rating), number of purchases, application size, etc.

In some embodiments, application catalog 115 may be configured to receive transaction requests for the download of software applications from consumers (e.g., via a user interface). Applications available through the application store may be offered to consumers in exchange for a fee or payment (e.g., one time payment, subscription, etc.). A customer may order one or more software applications listed in application catalog 115 and provide payment information to be used to pay the one time fee or first subscription payment.

Orders received by application catalog 115 may be forwarded for payment processing by a payment provider 125 (e.g., CyberSource). For example, details relating to the order (e.g., specific applications ordered, number of applications, etc.) and payment for the order (e.g., account number, credit card number, credit card expiration, security code, billing name and address, etc.) may be transmitted to a computer system of payment provider 125, and payment provider 125 may subsequently process payment for the purchased software applications. In some embodiments, payment provider 125 may arrange financial authorization for the requested transaction based on the provided payment information, charge application fees, determine any applicable taxes and/or fees, etc. Payment provider 125 may provide transaction processing circuit 105 with data relating to purchases, refunds, chargebacks, etc. for any orders handled by payment provider 125.

Application catalog 115 may also provide information about orders directly to transaction processing circuit 105. In some embodiments, one or more functions related to handling transaction requests may alternatively or additionally be performed by transaction processing circuit 105.

Transaction processing circuit 105 is configured to process and/or organize transactions for software applications received by application catalog 115. In some embodiments, transaction processing circuit 105 may operate in conjunction with a payment system 110 to process transactions (e.g., may be a system that processes data and provides the processed data to another system or subsystem). For example, transaction processing circuit 105 may be configured to receive order and/or payment data from application catalog 115 and/or payment provider 125, process the orders into batches, process each order batch (e.g., by applying one or more business rules), and/or summarize the transactions, revenue, and/or payment in a format that may be transmitted to payment system 110. Processing transactions using transaction processing circuit 105 and transmitting summaries to payment system 110 rather than transmitting each individual transaction may allow payment system 110 to be less complex (e.g., less costly, less difficult to design, etc.) than if payment system 110 were responsible for handling each individual transaction. For example, in a micropayment system involving a high volume of transactions (greater than a minimum volume such as 1,000 transactions per day, 10,000 transactions per day, 50,000 transactions per day, 100,000 transactions per month, 500,000 transactions per month, etc.) each having a relative low monetary value (e.g., an average or maximum value of less than a predetermined value such as one dollar, five dollars, ten dollars, etc.), millions of individual transactions may be processed by transaction processing system 105 into a small number of summaries (e.g., daily, weekly, monthly, etc.).

Transaction processing circuit 105 is configured to receive data relating to application orders from application catalog 115 and/or payment provider 125. Transaction processing circuit 105 may be configured to organize the orders into one or more batches of orders to be processed. Transaction processing circuit 105 may be configured to organize orders into batches based on the size of the orders (e.g., number of applications, monetary value, total download size, etc.), characteristics of the ordered applications (e.g., application size, application type or category, application name, etc.), application developer and/or developer characteristics (e.g., developer size, business area, geographic location, etc.), customer and/or customer characteristics (e.g., customer type, such as frequent or occasional customer, customer geographic location), payment type (e.g., credit card, credit account, money order, gift card, promotional discounts, etc.), and/or any other data related to the orders.

Each batch of orders may be placed in a queue. In some embodiments, multiple computing systems (e.g., servers) may be used to process the batches of orders. For example, part or all of transaction processing circuit 105 may be implemented in a cloud computing environment (e.g., in the manner described below with respect to FIG. 3). In some such embodiments, queues may be organized to prioritize the processing of the order batches by the computing systems or resources.

Transaction processing circuit 105 may be configured to retrieve order batches from the queues and process each order batch. Each batch may be processed by applying one or more business rules to the batch. For example, for each batch, order data related to the batch that is received from application catalog 115 may be compared with order payment data received from payment provider 125. If payment is not received for the order within a certain timeframe, transaction processing circuit 105 may be configured to activate an alert to a human user to investigate why payment has not been received. In other embodiments, transaction processing circuit 105 may be configured to instruct an automated payment conflict resolution system or module to determine why payment has not been received.

Transaction processing circuit 105 may additionally or alternatively be configured to calculate revenue data related to each batch. For example, if a batch is for applications developed by a particular developer, transaction processing circuit 105 may be configured to determine how much of the total revenue associated with the batch is to be retained by an owner of the application store, given to the developer, paid in taxes and/or other fees, etc.

Transaction processing circuit 105 may also be configured to generate revenue summaries or reports related to the orders received via application catalog 115 and/or payment provider 125. The revenue summaries may represent revenue data and/or other financial information related to the orders. In some embodiments, each revenue summary may represent data related to orders received for a particular time period. In other embodiments, different revenue summaries and/or portions of revenue summaries may be alternatively or additionally related to different batches, developers, customers, payment types, application types, etc. In some embodiments, each revenue summary may include data enabling the revenue data to be reviewed and/or analyzed by order characteristics such as developer, customer, payment type, application type, order size, etc. In some embodiments, the revenue summaries may include the total revenue collected (e.g., for a particular time period, such as a day, week, month, etc.), total amount owed to vendors, revenue by geographic region (e.g., country, continent, state, etc.) and/or currency, etc.

Transaction processing circuit 105 may also be configured to generate a vendor payment summary or report. A vendor payment summary may represent the amount of money and/or percentage or share of total revenue (e.g., for a particular time period, such as a month) that should be given to one or more developers. For example, a vendor payment summary for a particular month may indicate that Application A has generated $35,000 in revenue, Application B has generated $2,000, and Application C has generated $8,250, and that the developer of each respective application should receive a fixed percentage of the revenue generated by its application. In some embodiments, a revenue summary may be generated for one timeframe (e.g., daily) and a vendor payment summary may be generated for another timeframe (e.g., monthly). The order data, revenue summaries, vendor payment summaries, and/or other data may be stored in a storage device (e.g., one or more memories, databases, etc.). The revenue summaries and/or vendor payment summaries may be transmitted (e.g., periodically) to payment system 110.

Payment system 110 is configured to manage payments to and/or from developers relating to application sales in the application store. Payment system 110 is configured to manage payments to developers for the sale of the developers' applications in the application store. In some embodiments, payment system 110 may be configured to work in conjunction with a payment partner 130 (e.g., PayPal) to make payments to the developers. Payments to the developers may be made based on data included in revenue summaries and/or vendor payment summaries received from transaction processing circuit 105. For example, payment system 110 may be configured to arrange payments to vendors on a periodic (e.g., monthly) basis, and a vendor payment summary received from transaction processing circuit 105 may indicate that Developer A is entitled to $15,000, Developer B is entitled to $2,000, and Developer C is entitled to $1,520. In such an example, based on the vendor payment summary, payment system 110 may direct payment partner 130 to distribute $15,000 to Developer A, $2,000 to Developer B, and $1,520 to Developer C. Payment partner 130 may be configured to make the payments based on the instructions from payment system 110. Payment partner 130 may return confirmation that the payments have been made to payment system 110. In some embodiments, payment partner 130 may return a revenue disbursement reconciliation report listing all transactions related to revenue disbursements.

Payment system 110 may also be configured to manage the receipt of fees (e.g., membership fees) from developers. Payment system 110 may be configured to receive data relating to subscribing developers from developer portal 120. The data may be related to developers that have newly joined through developer portal 120 and/or developers having information that has changed. The data may include, for example, one or more developers' name, mailing address, billing address, phone number, revenue account information, fee payment account information, etc.

Payment system 110 may also be configured to receive data from developer portal 120 relating to the payment of membership fees by developers. The data may include the monetary value paid by a developer. In some embodiments, system 100 may support multiple different membership levels (e.g., a short term membership with a high monthly fee and a longer term membership with a lower monthly fee) and the data may include the membership level for which the developer paid. In some embodiments, payment system 100 may be configured to receive a membership fee reconciliation report listing any developer fees received and/or processed by payment partner 130. Payment system 110 may be configured to compare the fee data received from developer portal 120 with the fee data received from payment partner 130 to determine if any conflicts exist between the data (e.g., if developer portal 120 reports the payment of a fee that was not received by payment partner 130).

In some embodiments, payment system 110 may be configured to provide transaction processing circuit 105 with one or more confirmation reports. In one embodiment, payment system 110 may be configured to provide transaction processing circuit 105 with confirmation that a revenue summary has been posted. If transaction processing circuit 105 transmits a revenue summary to payment system 110 and does not receive confirmation (e.g., within a predetermined timeframe), transaction processing circuit 105 may be configured to activate an alert and/or take other action.

In another embodiment, payment system 110 may be configured to provide transaction processing circuit 105 with confirmation that payments have been made to one or more vendors. If transaction processing circuit 105 transmits a vendor payment summary to payment system 110 and does not receive confirmation, transaction processing circuit 105 may be configured to activate an alert and/or take other action. In some embodiments, transaction processing circuit 105 may be configured to transmit a payment confirmation (e.g., including information contained in the confirmation received from payment system 110) to one or more developers via developer portal 120.

In some embodiments, transaction system 105 may be configured to analyze transactions made using application catalog 115 and generate one or more analytics reports. For example, transaction system 105 may be configured to analyze data regarding the transactions and generate a report that identifies one or more different types of information for a reporting period, such as the most popular applications by download volume, top grossing applications and/or developers, most popular applications by carrier, top categories of applications (e.g., games, productivity, travel, etc.), and/or other types of information. This information may be transmitted to application catalog 115 for presentation to consumers. For example, the information may be used to present a recommendations screen to consumers using application catalog 115 and/or assist in consumer searches for desired applications. In some embodiments, the analytics information may be transmitted to developer portal 120 for viewing and/or use by application developers.

Figure 2:
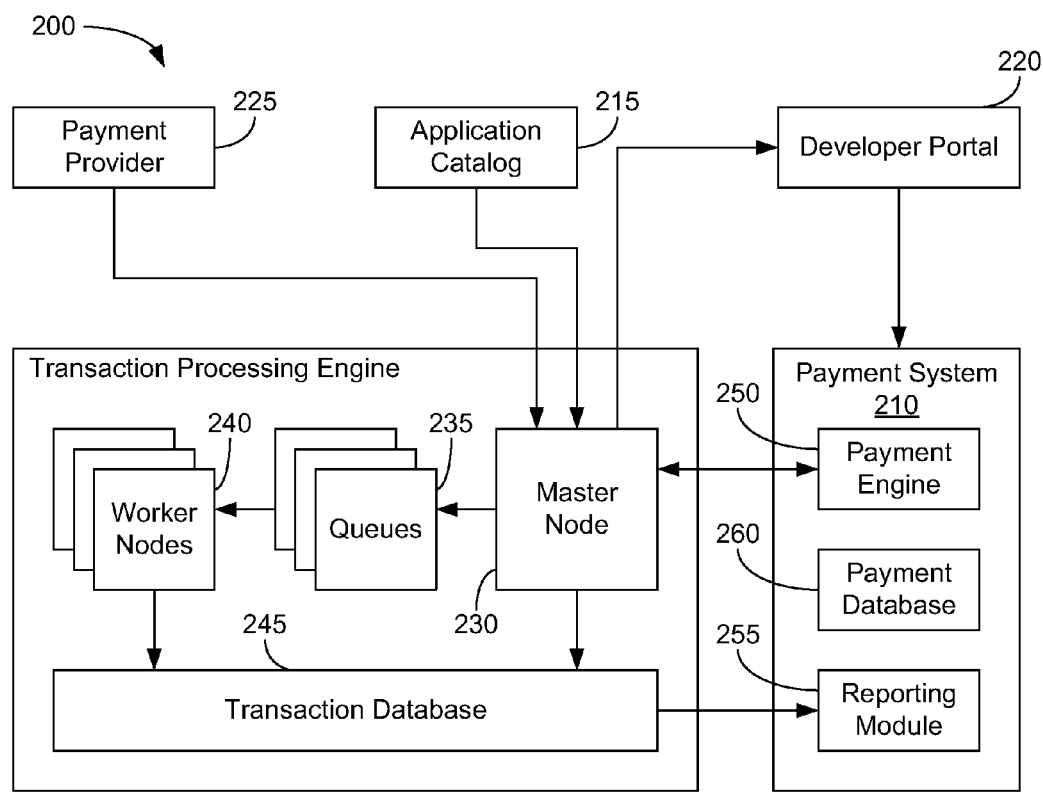
FIG. 2 is a block diagram of a system for processing transactions according to another exemplary embodiment.

Referring now to FIG. 2, a system 200 for processing transactions is shown according to an exemplary embodiment. System 200 may be a more detailed implementation of a system such as system 100. System 200 includes a transaction processing circuit 205. Transaction processing circuit 205 may include a master node 230, one or more queuing nodes 235, one or more worker nodes 240, and a transaction database 245. In various embodiments, one or more components of transaction processing circuit 205 may be implemented as instructions stored on one or more computer-readable media (e.g., memories) and executable by one or more processors. In some embodiments, one or more components of transaction processing circuit 205 may be implemented in a cloud computing environment (e.g., in the manner shown herein with respect to FIG. 3). In some embodiments, one or more components of transaction processing circuit 205 may be implemented using the Java programming language.

Master node 230 is configured to coordinate the processing of transactions by transaction processing circuit 205. Master node 230 may be configured to receive data relating to one or more transactions from an application catalog 215 and/or a payment provider 225. Customers may place orders for one or more software applications through application catalog 215, and payment for the orders may be processed by payment provider 225. In some embodiments, master node 230 may be configured to receive purchase data from application catalog 215 and/or payment data from payment provider 225.

Master node 230 may be configured to group one or more transactions (e.g., including purchase and/or payment data for the transactions) into one or more batches. A batch may comprise a plurality of transaction data files sharing at least one criteria. The transactions may be grouped into batches based on the customer, developer, application, or any other criteria. In some embodiments, master node 230 may receive the data from application catalog 215 and/or payment provider 225 in batches. In such embodiments, master node 230 may leave the transactions in the received batches or reorganize them into different batches.

Master node 230 may be configured to assign each of the batches to one or more queues. The batches may be assigned to queues in any of a variety of ways, such as based on developer type, application type, monetary value of transactions, priority of transactions, etc. In some embodiments, the batches may be entered into queues by one or more queuing nodes 235. The batches may remain in the queues until they are retrieved from the queues by worker nodes 240.

One or more worker nodes 240 may be configured to retrieve transaction batches from the queues and process the batches. Processing the batches may include applying one or more business rules to the batches. For example, one business rule may dictate that the purchase data received from application catalog 215 for each transaction must be consistent with the payment data received from payment provider 225 for the transaction. If the data is not consistent, transaction processing circuit 205 (e.g., master node 230, worker nodes 240, and/or other components of transaction processing circuit 205) may be configured to attempt to resolve the inconsistency. For example, for a particular transaction, the purchase data from application catalog 215 may indicate that a customer purchased five applications at a value of ten dollars, but the payment data from payment provider 225 may indicate that no payment was processed for the transaction, or only a payment of five dollars was processed for the transaction. In such an example, the worker node 240 may identify the inconsistency and transaction processing circuit 205 may be configured to alert a user of the inconsistency. In some embodiments, transaction processing circuit 205 may be configured to communicate with payment provider 225 to request information and/or resolve the inconsistency.

Master node 230 and/or worker nodes 240 may be configured to organize the data for summarization and generate one or more revenue summaries and/or vendor payment summaries. The revenue summaries, vendor payment summaries, purchase data, payment data, business rules, data relating to the application of the business rules, transaction data, and/or any other type of data may be stored in a transaction database 245. In some embodiments, data may be stored in one or more partitioned tables. In some embodiments, data stored in transaction database 245 may be stored and/or replicated in one or more redundant storage media to protect against data loss in the event of physical and/or logical damage to transaction database 245. The revenue summaries and/or vendor payment summaries may be transmitted to a payment system 210.

Payment system 210 may be configured to receive revenue summaries and/or vendor payment summaries from transaction processing circuit 105. Payment system 210 may include a reporting module 255 configured to post and/or store (e.g., in a payment database 260) data included in the revenue summaries. The data posted by reporting module 255 may include the total revenue received for a particular timeline (e.g., a particular day), the portion of the total revenue that is retained by the application store owner, the portion of the total revenue that is to be paid to developers and/or other parties, and/or other types of data. In some embodiments, a payment circuit 250 may be configured to return a revenue confirmation report to master node 230 of transaction processing circuit 205 confirming that the revenue data has been posted.

Payment system 210 may also be configured to arrange payments to one or more developers based on data received in vendor payment summaries. Payment system 210 may include a payment circuit 250 configured to analyze the data included in the vendor payment summaries for any errors. If no errors are discovered, payment circuit 250 may be configured to arrange payment of the developers according to the data in the vendor payment summaries (e.g., in conjunction with a payment partner). In some embodiments, payment circuit 250 may be configured to return a vendor payment confirmation report confirming payment of the developers. In some embodiments, master node 230 may be configured to send a payment report to one or more developers through developer portal 220 indicating that revenue payments have been made.

In some embodiments, payment system 210 may be configured to arrange the receipt of fees (e.g., membership fees) from developers (e.g., using a payment partner). In such embodiments, payment circuit 250 may be configured to transmit a membership fee report to master node 230 including data relating to membership fees paid by one or more developers.

Figure 3:
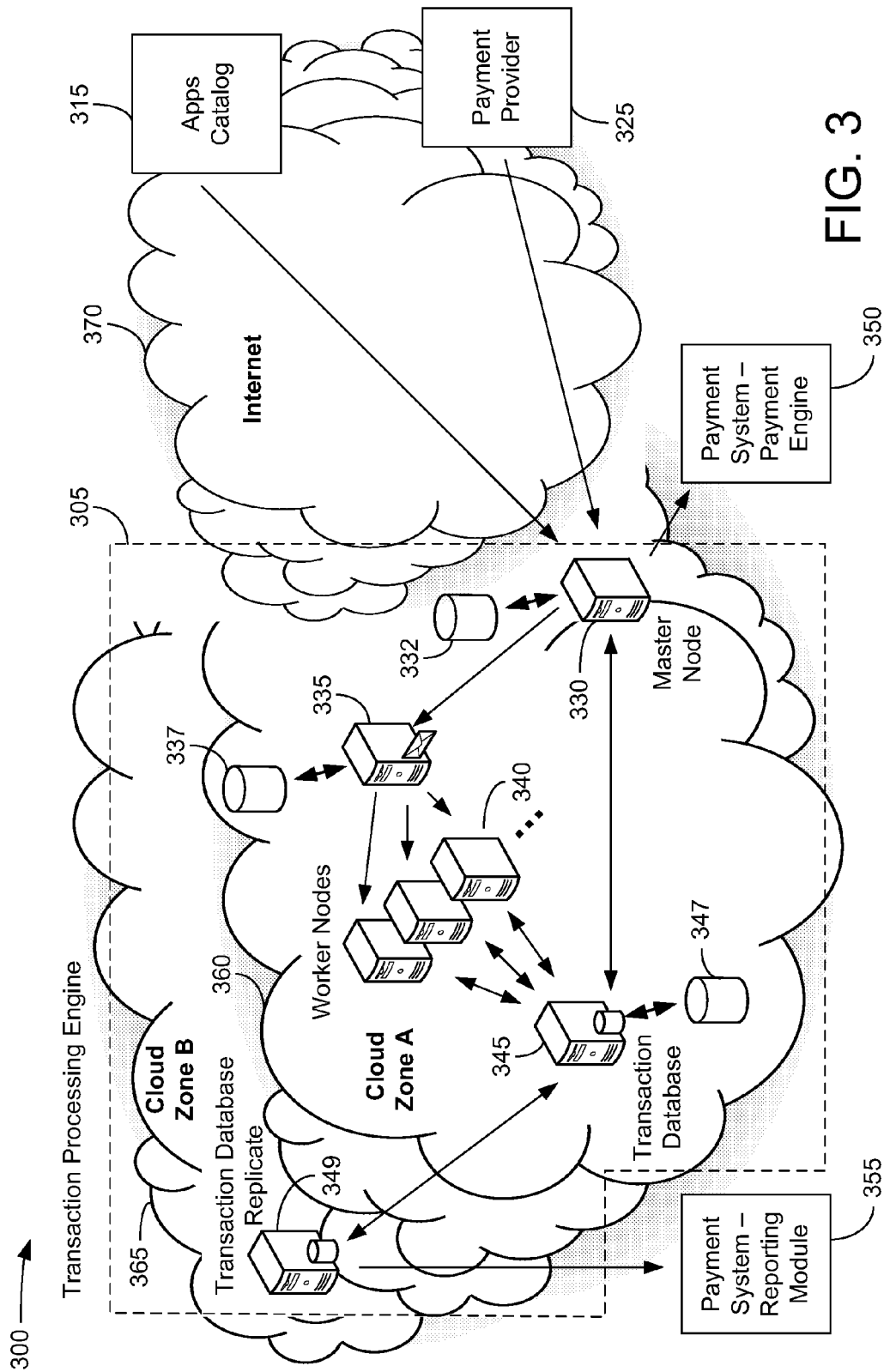
FIG. 3 is a block diagram of a system for processing transactions according to yet another exemplary embodiment.

Referring now to FIG. 3, a block diagram of a system 300 for processing transactions is shown according to yet another exemplary embodiment. FIG. 3 illustrates an exemplary computing architecture that may be utilized to implement one or more components of a transaction system (e.g., such as systems 100 and/or 200). The computing architecture illustrated in FIG. 3 includes a shared, scalable computing resource such as a computing cloud. System 300 includes a transaction processing system 305. Various components of transaction processing circuit 305 are implemented using cloud-based resources. In various embodiments, the computing cloud utilized to implement components of transaction processing circuit 305 may be a private cloud, public cloud (e.g., Amazon Elastic Compute Cloud, or E2C), or a hybrid cloud. In some embodiments, the cloud may be partitioned into two or more zones (e.g., cloud zones A 360 and B 365).

Transaction processing circuit 305 includes a master node 330 (e.g., similar to master node 230) configured to receive data related to one or more transactions from applications catalog 315, payment provider 325, payment circuit 350, and/or other components and process the transactions. The data may be received over a computing network 370 (e.g., the Internet). Master node 330 may be configured to organize one or more transactions into batches. The transaction batches may be placed into queues at queuing node 335. The batches may be retrieved from the queues by worker nodes 340 and processed (e.g., by applying one or more business rules. In some embodiments, one or more revenue and/or vendor payment summaries may be generated by worker nodes 340 and/or master node 330. Data related to the transactions may be stored in transaction database 345 (and, in some embodiments, redundantly stored in transaction database replicate 349). The revenue and/or vendor payment summaries may be transmitted to payment system reporting module 355. In various embodiments, one or more components of transaction processing circuit 305 may be coupled to storage devices (e.g., storage devices 332, 337, and/or 347).

Various components of transaction processing circuit 305 are implemented in a cloud computing environment (e.g., using different computing and/or storage resources allocated over a network). In some embodiments, cloud resources may be allocated based on processing and/or storage needs of transaction processing circuit 305. For example, if a small amount of transactions require processing, a smaller amount of resources (e.g., fewer worker nodes 340) may be purchased and utilized. If a large amount of transactions require processing, a larger amount of resources may be purchased and utilized. In some embodiments, cloud resources may be dynamically and/or flexibly ordered such that only resources presently needed are ordered and purchased at any given time.

In some embodiments, cloud resources may be allocated based at least in part on the volume of transactions received from application catalog 315. Transaction processing system 305 may be configured to measure transactions received for processing over a period of time (e.g., one day, three days, one week, two weeks, one month, etc.). Based on the number of transactions processed, the cloud resources used to implement transaction processing circuit 305 may be adjusted (i.e., increased or decreased). For example, transaction processing system 305 may determine that 1,500 transactions were processed during a first time period, and a first level or capacity of cloud processing resources may be allocated or requested for implementing transaction processing system 305. Transaction processing system 305 may subsequently determine that 12,000 transactions were processed during a second time period, and a second level or capacity of cloud processing resources may be allocated that is greater than the first level. Transaction processing system 305 may again subsequently determine that 5,000 transactions were processed during a third time period, and a third level or capacity of cloud resources may be allocated that is greater than the first level and less than the second level.

In some embodiments, transaction processing system 305 may be configured to monitor (e.g., continuously, periodically, etc.) the number of transactions being processed and adjust the level of capacity of cloud resources being allocated to implementing transaction processing system 305 based on a rate at which transactions are being processed. For example, in one embodiment, transaction processing system 305 may be configured to request additional cloud resources if the rate at which transactions are requested through application catalog 315 exceeds one or more threshold rates and/or request a decrease in cloud resources if the rate falls below one or more threshold rates (e.g., instantaneously, over a period of time, etc.). Utilizing cloud resources may result in substantial cost savings as compared to implementation in a monolithic environment, where computing and storage power (e.g., server capacity) must be designed to meet the greatest anticipated needs as opposed to only the actual needs at any point in time.

In some embodiments, a transaction processing circuit (e.g., transaction processing circuit 205 and/or 305) and a payment system (e.g., payment system 210) may be separate systems. For example, each system may be operated by different corporate entities (e.g., the transaction processing circuit may be operated by Palm and the payment system may be operated by a non-Palm entity). In some embodiments, the transaction processing circuit and the payment system may operate on separate computing systems and/or computing networks that may be geographically remote (e.g., five miles apart, ten miles apart, 50 miles apart, 100 miles apart, etc.) from one another. In some embodiments, the transaction processing circuit may be configured to communicate with the payment system over at least one network (e.g., a wide area network, or WAN, such as the Internet) or over at least two networks (e.g., one local area network, or LAN, and one WAN). In some embodiments, the transaction processing circuit may be implemented using a shared, scalable computing resource such as a cloud computing environment and the payment system may be implemented using a non-cloud computing resource such as a fixed or static computing resource (e.g., a server system).

Figure 4A:
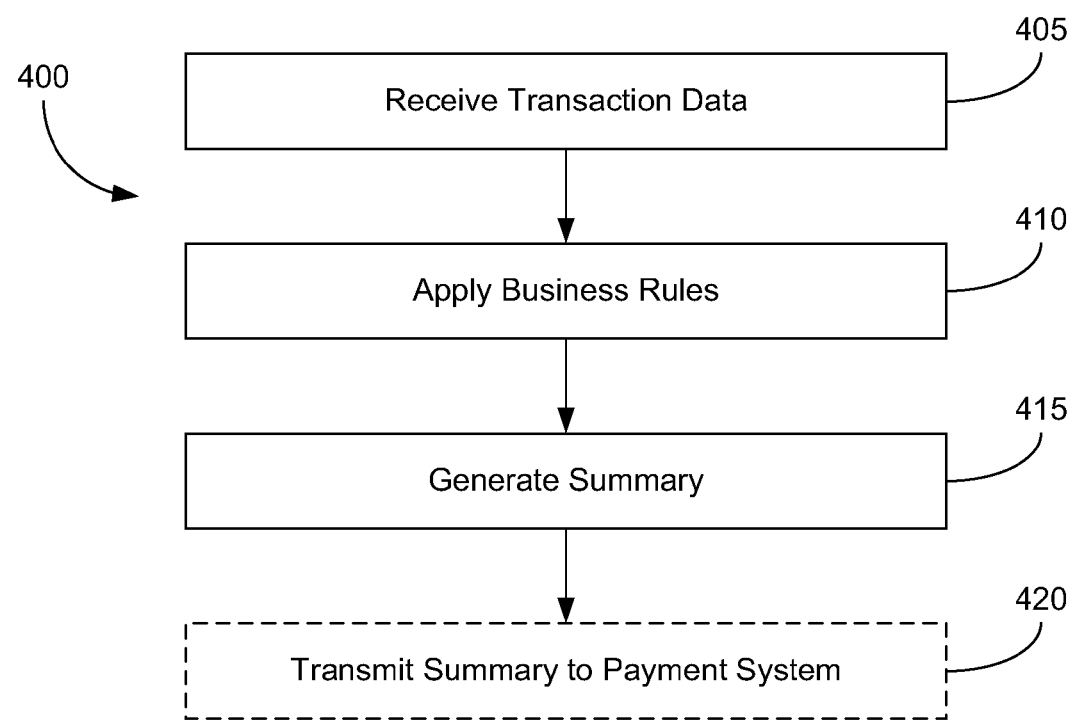
FIG. 4A is a flow diagram of a process for processing transactions according to an exemplary embodiment.

Referring now to FIG. 4A, a process 400 for processing transactions is provided according to an exemplary embodiment. In some embodiments, process 400 may be executed utilizing various components of systems such as systems 100, 200, and/or 300. Data relating to one or more transactions may be received at a transaction processing circuit (operation 405). The data may be used to apply one or more business rules to each transaction or group of transactions (operation 410). The transaction processing circuit may also be configured to generate one or more summaries based on the received data and/or the application of the one or more business rules (operation 415). The summaries may include a revenue summary and/or a vendor payment summary. The summaries may be transmitted to a payment system configured to track revenue generated in connection with the transactions (operation 420). The payment system may additionally or alternatively be configured to distribute revenue to vendors (e.g., developers) and/or receive payments (e.g., membership fees) from vendors.

Figure 4B:
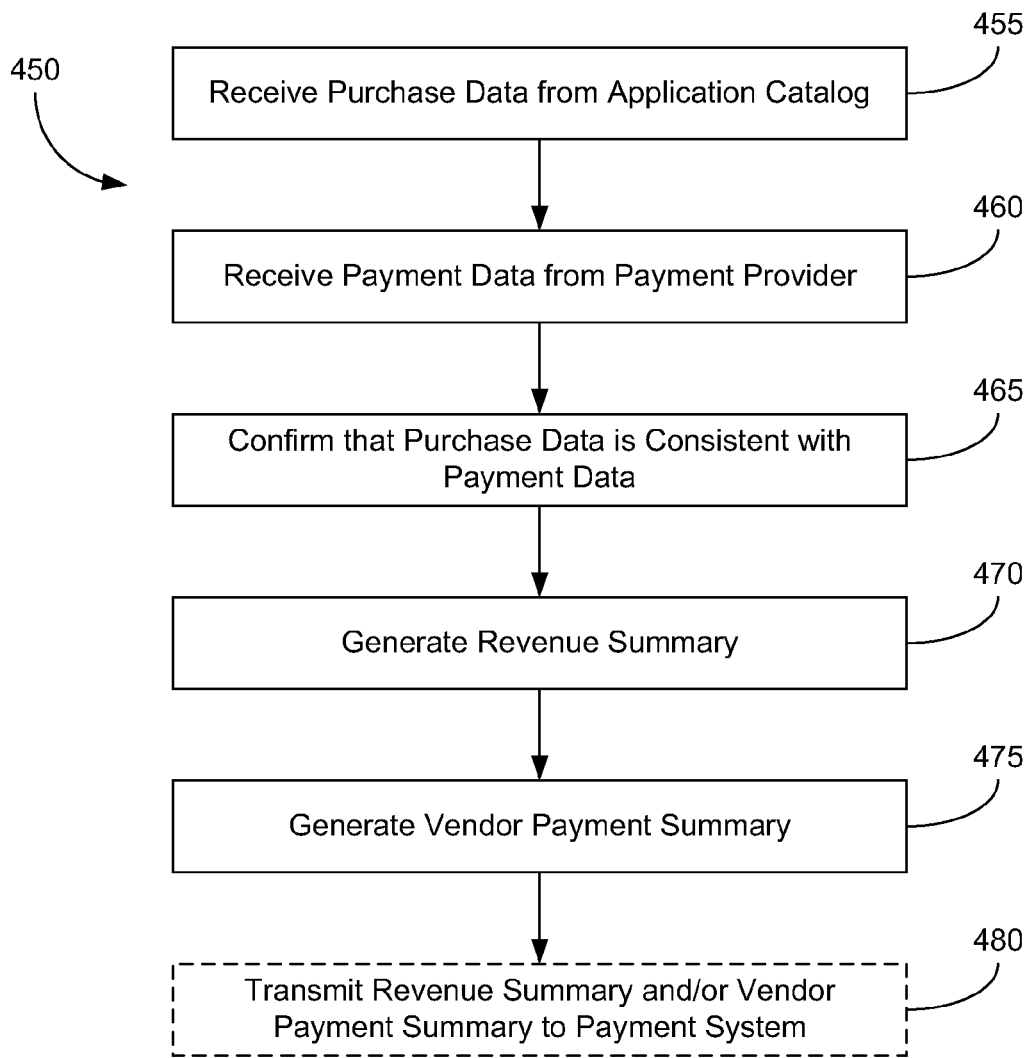
FIG. 4B is a flow diagram of a process for processing transactions according to another exemplary embodiment.
Figure 5:
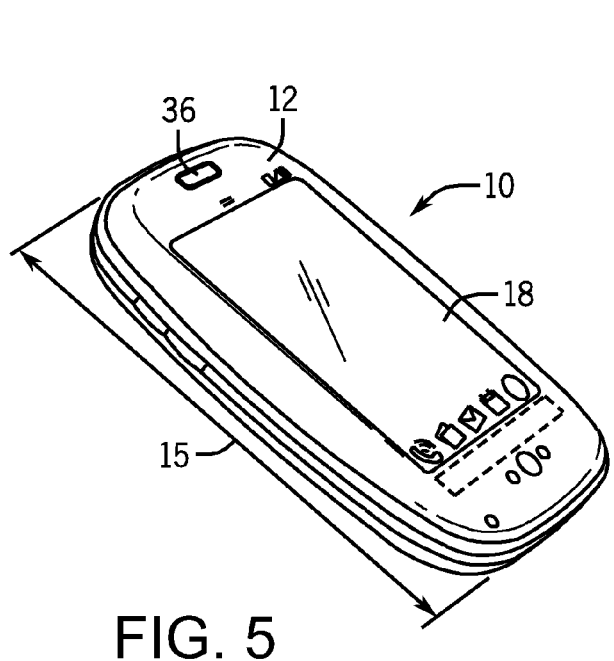
FIG. 5 is a perspective view of a mobile computing device according to an exemplary embodiment.

Referring now to FIG. 4B, a process 450 for processing transactions is provided according to an exemplary embodiment. In some embodiments, process 450 may be executed utilizing various components of systems such as systems 100, 200, and/or 300. Purchase data relating to one or more transactions (e.g., for the purchase of software applications) may be received from an application catalog at a transaction processing circuit (operation 455). Payment data relating to the transactions may be received from a payment provider at the transaction processing circuit (operation 460).

Transaction processing circuit may be configured to process the purchase data and payment data received from the application catalog and payment provider, respectively, to confirm that the purchase data is consistent with the payment data (e.g., such that payment has been successfully received for the purchased applications) (operation 465). Processing the data may include comparing the purchase data and payment data to determine if the received payment reflected in the payment data for each transaction matches the expected payment reflected in the purchase data. For example, if the purchase data reflects that a particular transaction was for five dollars, the transaction processing circuit may review the payment data to confirm that the payment received for that transaction was five dollars.

The transaction processing circuit may be configured to generate summaries relating to the transactions. The transaction processing circuit may be configured to generate a revenue summary (operation 470). The revenue summary may include data related to revenue generated in connection with the transactions. In some embodiments, each revenue summary may be related to a particular time period. In some embodiments, the revenue summary may include data relating to what portion of the revenue for the time period is to be distributed to developers of the software applications on which the transactions were based.

The transaction processing circuit may be configured to generate a vendor payment summary (operation 475). The vendor payment summary may include data relating to payments (e.g., monetary value, portion of revenue, etc.) that should be made to one or more developers in connection with transactions for applications they have developed. In some embodiments, each vendor payment summary may be related to a particular time period.

The revenue summary and/or vendor payment summary may be transmitted to a payment system (operation 480). The payment system may post revenue and/or make payments to developers based on the revenue and/or vendor payment summaries.

Exemplary Mobile Device

Referring to FIGS. 5-8, a mobile device 10 is shown. In some embodiments, mobile device 10 may be configured to access an application store to purchase software applications, and the application store may utilize systems and/or methods similar to those described above to process the transactions. The teachings herein can be applied to device 10 or to other electronic devices (e.g., a desktop computer), such as mobile computing devices (e.g., a laptop computer) or handheld computing devices, such as a personal digital assistant (PDA), smartphone, mobile telephone, personal navigation device, handheld digital camera, handheld relative navigation device, etc. According to one embodiment, device 10 may be a smartphone, which is a combination mobile telephone and handheld computer having PDA functionality. PDA functionality can comprise one or more personal information management applications (e.g., including personal data applications such as email, calendar, contacts, etc.), database functions, word processing, spreadsheets, voice memo recording, Global Positioning System (GPS) functionality, etc. Device 10 may be configured to synchronize (e.g., two-way file synchronization) personal information from these applications with a computer (e.g., a desktop, laptop, server, etc.). Device 10 may be further configured to receive and operate additional applications provided to device 10 after manufacture, e.g., via wired or wireless download (such as from an "application store" operable on remote server computers), Secure Digital card, etc.

As shown in FIGS. 5-8, device 10 includes a housing 12 and a front 14 and a back 16. Device 10 further comprises a display 18 and a user input device 20 (e.g., a QWERTY keyboard, buttons, touch screen, microphone for speech recognition engine, etc.). Display 18 may comprise a touch screen display in order to provide user input to a processor to control functions, such as to select options displayed on display 18, enter text input to device 10, or enter other types of input. Display 18 also provides images (e.g., a geographic map, application icons, a web browser, etc.) that are displayed and may be viewed by users of device 10. User input device 20 can provide similar inputs as those of touch screen display 18. An input button 40 may be provided on front 14 and may be configured to perform pre-programmed functions. Device 10 can further comprise a speaker 26, a stylus (not shown) to assist the user in making selections on display 18, a camera 28, a camera flash 32, a microphone 34, and an earpiece 36. Display 18 may comprise a capacitive touch screen, a mutual capacitance touch screen, a self capacitance touch screen, a resistive touch screen, a touch screen using cameras and light such as a surface multi-touch screen, proximity sensors, or other touch screen technologies. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input. Further, a gesture area 30 may be provided adjacent (e.g., below, above, to a side, etc.) or be incorporated into display 18 to receive various gestures as inputs, including taps, swipes, drags, flips, pinches, and so on, including multiple touch and multiple swipe commands (e.g., to zoom and/or pan an image such as a geographic map). One or more indicator areas 38 (e.g., lights, etc.) may be provided to indicate that a gesture has been received from a user.

According to an exemplary embodiment, housing 12 is configured to hold a screen such as display 18 in a fixed or movable (e.g., slidable, rotatable, hinged, etc.) relationship above a user input device such as user input device 20 in a substantially parallel or same plane, or in a different plane. This fixed relationship excludes a hinged or movable relationship between the screen and the user input device (e.g., a plurality of keys) in the fixed embodiment.

Figure 6:
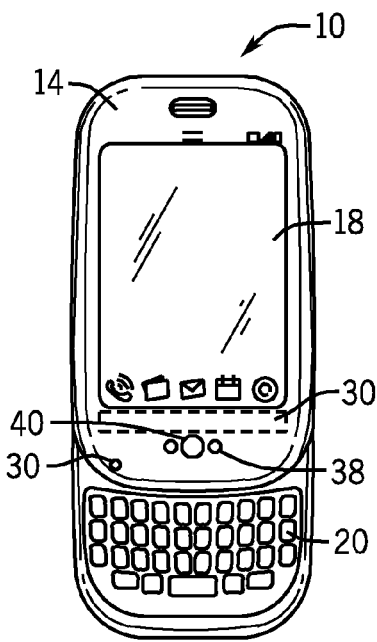
FIG. 6 is a front view of the mobile computing device of FIG. 5 in an extended configuration according to an exemplary embodiment.
Figure 7:
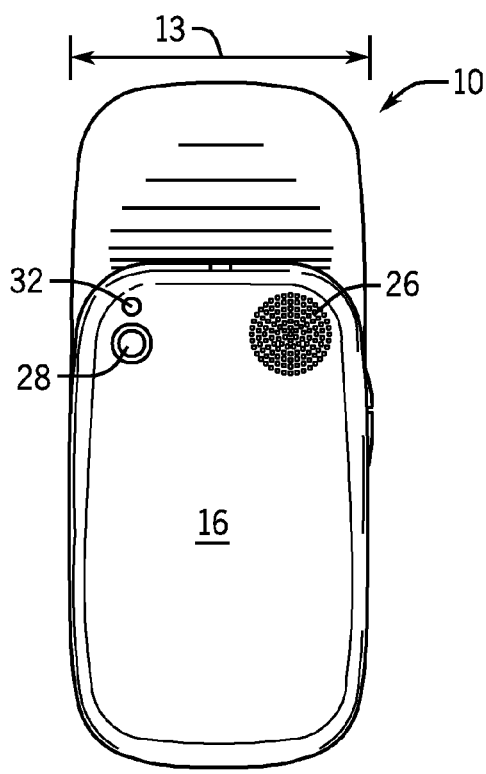
FIG. 7 is a back view of the mobile computing device of FIG. 5 in an extended configuration according to an exemplary embodiment.
Figure 8:
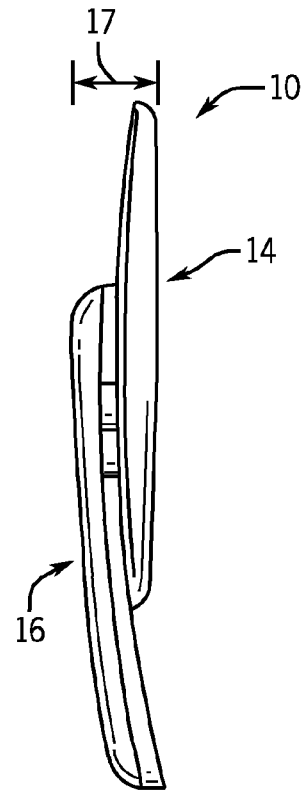
FIG. 8 is a side view of the mobile computing device of FIG. 5 in an extended configuration according to an exemplary embodiment.

Device 10 may be a handheld computer, which is a computer small enough to be carried in a hand of a user, comprising such devices as typical mobile telephones and personal digital assistants, but excluding typical laptop computers and tablet PCs. The various input devices and other components of device 10 as described below may be positioned anywhere on device 10 (e.g., the front surface shown in FIG. 6, the rear surface shown in FIG. 7, the side surfaces as shown in FIG. 8, etc.). Furthermore, various components such as a keyboard etc. may be retractable to slide in and out from a portion of device 10 to be revealed along any of the sides of device 10, etc. For example, as shown in FIGS. 6-8, front 14 may be slidably adjustable relative to back 16 to reveal input device 20, such that in a retracted configuration (see FIG. 5) input device 20 is not visible, and in an extended configuration (see FIGS. 6-8) input device 20 is visible.

According to various exemplary embodiments, housing 12 may be any size, shape, and have a variety of length, width, thickness, and volume dimensions. For example, width 13 may be no more than about 200 millimeters (mm), 100 mm, 85 mm, or 65 mm, or alternatively, at least about 30 mm, 50 mm, or 55 mm. Length 15 may be no more than about 200 mm, 150 mm, 135 mm, or 125 mm, or alternatively, at least about 70 mm or 100 mm. Thickness 17 may be no more than about 150 mm, 50 mm, 25 mm, or 15 mm, or alternatively, at least about 10 mm, 15 mm, or 50 mm. The volume of housing 12 may be no more than about 2500 cubic centimeters (cc) or 1500 cc, or alternatively, at least about 1000 cc or 600 cc.

Device 10 may provide voice communications or telephony functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 10 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Long Term Evolution (LTE) systems, etc.

Device 10 may be configured to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 10 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, etc.

Figure 9:
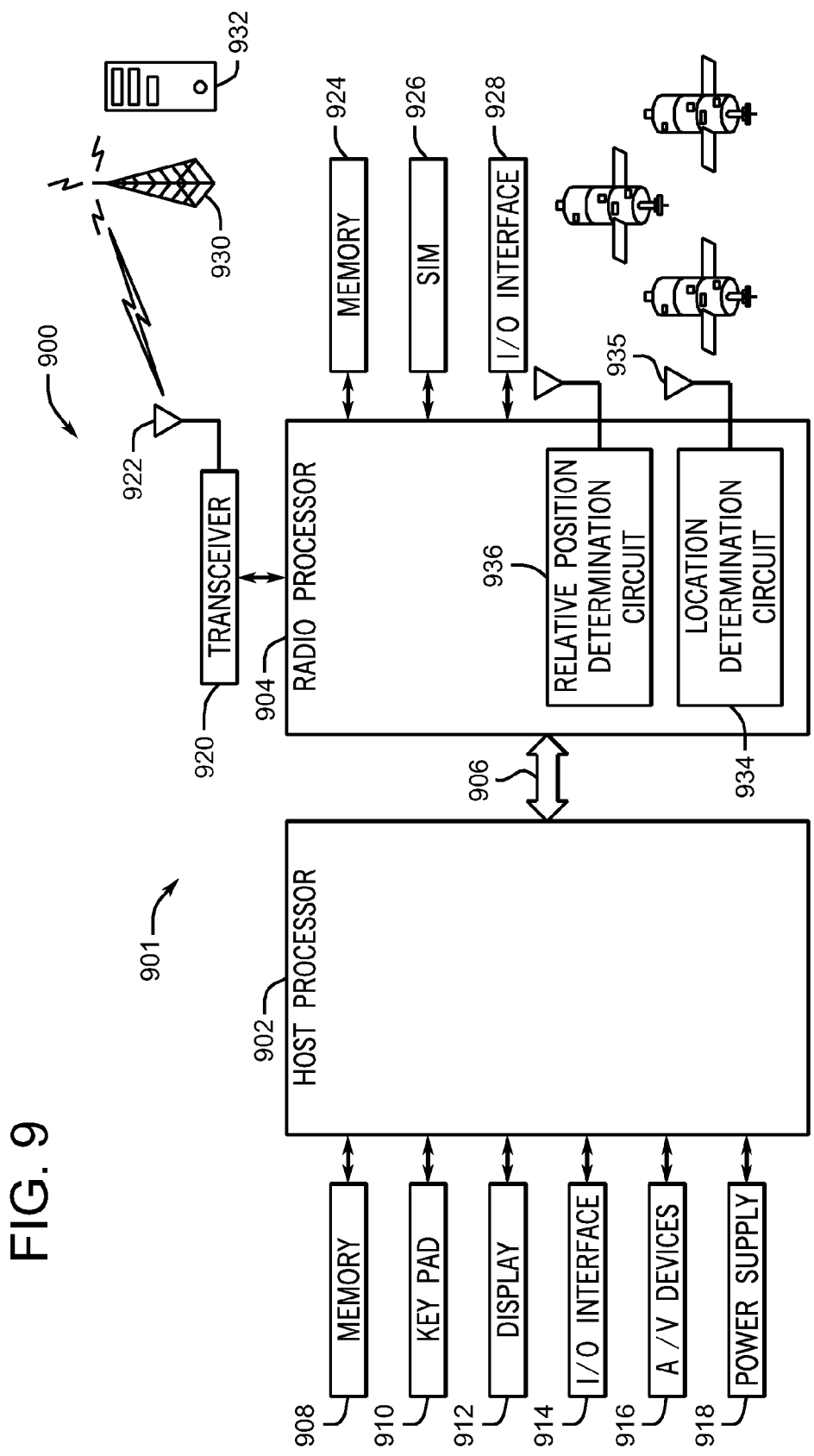
FIG. 9 is a block diagram of the mobile computing device of FIG. 5 according to an exemplary embodiment.

As shown in the embodiment of FIG. 9, device 10 may comprise a processing circuit 901 having a dual processor architecture including a host processor 902 and a radio processor 904 (e.g., a base band processor). The host processor 902 and the radio processor 904 may be configured to communicate with each other using interfaces 906 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 902 may be responsible for executing various software programs such as application programs and system programs to provide computing and processing operations for device 10. The radio processor 904 may be responsible for performing various voice and data communications operations for device 10 such as transmitting and receiving voice and data information over one or more wireless communications channels. Although embodiments of the dual processor architecture may be described as comprising the host processor 902 and the radio processor 904 for purposes of illustration, the dual processor architecture of device 10 may comprise additional processors, may be implemented as a dual- or multi-core chip with both host processor 902 and radio processor 904 on a single chip, etc.

In various embodiments, the host processor 902 may be implemented as a host central processing unit (CPU) using any suitable processor or logic device, such as a general purpose processor. The host processor 902 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 902 is an OMAP2, such as an OMAP2431 processor, manufactured by Texas Instruments, Inc.

The host processor 902 may be configured to provide processing or computing resources to device 10. For example, the host processor 902 may be responsible for executing various software programs such as application programs and system programs to provide computing and processing operations for device 10. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 10 and a user.

System programs assist in the running of the computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), a username/password protection program, and so forth. Device 10 may utilize any suitable OS in accordance with the described embodiments such as a Palm webOS, Palm OS®, Palm OS® Cobalt, Microsoft® Windows OS, Microsoft Windows® CE, Microsoft Pocket PC, Microsoft Windows Mobile, Symbian OS™, Embedix OS, Linux, Binary Run-time Environment for Wireless (BREW) OS, JavaOS, a Wireless Application Protocol (WAP) OS, etc.

Device 10 may comprise a memory 908 coupled to the host processor 902 and a memory 924 coupled to the radio processor 904. In various embodiments, memories 908, 924 may be configured to store one or more software programs to be executed by the host processor 902 and/or radio processor 904. The memory 908 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), read-only memory (ROM), flash memory, or any other type of media suitable for storing information.

Although the memory 908 may be shown as being separate from the host processor 902 for purposes of illustration, in various embodiments some portion or the entire memory 908 may be included on the same integrated circuit as the host processor 902. Alternatively, some portion or the entire memory 908 may be disposed on an integrated circuit or other medium (e.g., hard disk drive) external to the integrated circuit of host processor 902. In various embodiments, device 10 may comprise an expansion slot to support a multimedia and/or memory card, for example.

Device 10 may comprise a user input device 910 coupled to the host processor 902. The user input device 910 may comprise, for example, a QWERTY and/or alphanumeric key layout and an integrated number dial pad. Device 10 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 902 may be coupled to a display 912. The display 912 may comprise any suitable visual interface for displaying content to a user of device 10. For example, the display 912 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 10 may comprise an input/output (I/O) interface 914 coupled to the host processor 902. The I/O interface 914 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 10 may be configured to transfer and/or synchronize information with the local computer system.

The host processor 902 may be coupled to various audio/video (A/V) devices 916 that support A/V capability of device 10. Examples of A/V devices 916 may include, for example, a microphone, one or more speakers, an audio port to connect an audio headset, an audio coder/decoder (codec), an audio player, a digital camera, a video camera, a video codec, a video player, and so forth.

The host processor 902 may be coupled to a power supply 918 configured to supply and manage power to the elements of device 10. In various embodiments, the power supply 918 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 904 may perform voice and/or data communication operations for device 10. For example, the radio processor 904 may be configured to communicate voice information and/or data information over one or more assigned frequency bands of a wireless communication channel. In various embodiments, the radio processor 904 may be implemented as a communications processor using any suitable processor or logic device, such as a modem processor or base band processor. The radio processor 904 may comprise, or be implemented as, a digital signal processor (DSP), media access control (MAC) processor, or any other type of communications processor in accordance with the described embodiments. Radio processor 904 may be any of a plurality of modems manufactured by Qualcomm, Inc. or other manufacturers.

In various embodiments, the radio processor 904 may perform analog and/or digital base band operations for device 10. For example, the radio processor 904 may perform digital-to-analog conversion (DAC), analog-to-digital conversion (ADC), modulation, demodulation, encoding, decoding, encryption, decryption, and so forth.

Device 10 may comprise a transceiver module 920 coupled to the radio processor 904. The transceiver module 920 may comprise one or more transceivers configured to communicate using different types of protocols, communication ranges, operating power requirements, RF sub-bands, information types (e.g., voice or data), use scenarios, applications, and so forth. In various embodiments, the transceiver module 920 may comprise one or more transceivers configured to support voice communication for a cellular radiotelephone system such as a GSM, UMTS, CDMA, and/or LTE system. The transceiver module 920 also may comprise one or more transceivers configured to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 920 may be implemented using one or more chips as desired for a given implementation. Although the transceiver module 920 may be shown as being separate from and external to the radio processor 904 for purposes of illustration, in various embodiments some portion or the entire transceiver module 920 may be included on the same integrated circuit as the radio processor 904.

Device 10 may comprise an antenna system 922 for transmitting and/or receiving electrical signals. As shown, the antenna system 922 may be coupled to the radio processor 904 through the transceiver module 920. The antenna system 922 may comprise or be implemented as one or more internal antennas and/or external antennas.

Device 10 may comprise a subscriber identity module (SIM) 926 coupled to the radio processor 904. The SIM 926 may comprise, for example, a removable or non-removable smart card configured to encrypt voice and data transmissions and to store user-specific data for allowing a voice or data communications network to identify and authenticate the user. The SIM 926 also may store data such as personal settings specific to the user.

Device 10 may comprise an I/O interface 928 coupled to the radio processor 904. The I/O interface 928 may comprise one or more I/O devices to enable wired (e.g., serial, cable, etc.) and/or wireless (e.g., WiFi, short range, etc.) communication between device 10 and one or more external computer systems.

In various embodiments, device 10 may comprise location or position determination capabilities. Device 10 may employ one or more absolute position determination techniques including, for example, Global Positioning System (GPS) techniques, Cell Global Identity (CGI) techniques, CGI including timing advance (TA) techniques, Assisted GPS (AGPS) techniques, hybrid techniques, etc. A Wi-Fi Positioning System may be used as another type of absolute positioning system, such as one provided by Skyhook Wireless, Inc., Boston, Mass. For example, an absolute positioning circuit may be configured to collect Wi-Fi identifier data from a plurality of nearby Wi-Fi access points (e.g., any wireless transceiver communicating according to an IEEE 802.11x protocol) and retrieve a latitude/longitude or other absolute position from a database by looking up the Wi-Fi access point identifiers received in the position of interest. In another example, a Wi-Fi access point may be configured to transmit its absolute position and device 10 may be configured to determine that its absolute position is the position of the Wi-Fi access point, within a predetermined error. Another type of absolute positioning system having less accuracy than GPS is a Cell-ID triangulation positioning system, such as one provided by Telmap, Ltd., London, United Kingdom.

Referring again to FIG. 9, processing circuit 901 may comprise a relative position determination circuit 936, shown in exemplary form as a part of the radio processor 904, though circuit 936 may be part of host processor 902 or any other portion of processing circuit 901. The relative position determination circuit may comprise circuitry and/or software configured to provide relative position data for device 10 relative to an object.

In various embodiments, device 10 may comprise dedicated hardware circuits or structures, or a combination of dedicated hardware and associated software, to support absolute and/or relative position determination, such as location determination circuit 934. For example, the transceiver module 920 and the antenna system 922 may comprise GPS receiver or transceiver hardware and one or more associated antennas coupled to the radio processor 904 to support position determination.

The host processor 902 may comprise and/or implement at least one LBS (location-based service) application. In general, the LBS application may comprise any type of client application executed by the host processor 902, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

Radio processor 904 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

Various embodiments disclosed herein may include or be implemented in connection with computer-readable media configured to store machine-executable instructions therein, and/or one or more modules, circuits, units, engines, systems, nodes or other elements that may comprise analog and/or digital circuit components (e.g. a processor or other processing circuit) configured or arranged to perform one or more of the steps recited herein. By way of example, computer-readable media may include non-transitory media such as RAM, ROM, CD-ROM, or other optical disk storage, magnetic disk storage, flash memory, or any other medium capable of storing and providing access to desired machine-executable instructions. The use of circuit, module or engine, system, node herein is meant to broadly encompass any one or more of discrete circuit components, analog and/or digital circuit components, integrated circuits, solid state devices and/or programmed portions of any of the foregoing, including microprocessors, microcontrollers, ASICs, programmable logic, or other electronic devices.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A system for processing transactions, comprising:
a transaction processing circuit configured to receive transaction data relating to one or more transactions for the purchase of software applications from a digital application store, to apply one or more business rules to the transaction data, and to generate one or more transaction summary files, wherein the transaction summary files are transmitted to a payment system configured to perform, based on the transaction summary files, at least one of recording revenue related to the transactions and causing payment to be distributed to developers of the software applications,
wherein at least a portion of the transaction processing circuit is implemented using a shared, scalable computing system, wherein a level of resources of the shared, scalable computing system requested for implementation of the transaction processing circuit is varied based on a volume of transactions processed by the transaction processing system.

2. The system of claim 1, wherein the payment system is implemented using a static computing resource.

3. The system of claim 1, wherein the transaction processing circuit comprises a master node configured to organize the transaction data into one or more transaction batches.

4. The system of claim 3, wherein the transaction processing circuit comprises a plurality of worker nodes configured to receive the transaction batches and applying the one or more business rules to the transaction data.

5. The system of claim 3, wherein the master node is configured to organize the transaction data into transaction batches based on any of a size of the transactions, an identity of an application developer of the software applications being purchased, customer characteristics and payment type.

6. The system of claim 1, wherein the payment system is configured to coordinate payment of membership fees from the developers, wherein the transaction processing circuit is configured to receive a report of fees paid by one or more of the developers from the payment system.

7. The system of claim 1, further comprising the payment system.

8. The system of claim 1, wherein the average value of transactions processed over a period of a month using the transaction processing circuit is less than five U.S. dollars.

9. The system of claim 1, wherein the transaction processing circuit is configured to permit payment via a plurality of different payment types.

10. The system of claim 1, wherein said transaction processing circuit dynamically accesses or relinquishes resources in a cloud as said volume of transactions processed by the transaction processing system passes an applicable threshold.

11. The system of claim 1, wherein the transaction data comprises purchase data received from an application catalog and payment data received from a payment provider, wherein the purchase data represents purchases made from the application catalog in relation to the one or more transactions, wherein the payment data represents payments received in relation to the one or more transactions, wherein applying the one or more business rules comprises confirming that the purchase data is consistent with the payment data.

12. A method of processing transactions, comprising:
receiving, at a transaction processing circuit, transaction data relating to one or more transactions for the purchase of software applications from a digital application store;
applying, using the transaction processing circuit, one or more business rules to the transaction data; and
generating, using the transaction processing circuit, one or more transaction summary files,
wherein the transaction summary files are transmitted to a payment system configured to perform, based on the transaction summary files, at least one of recording revenue related to the transactions and causing payment to be distributed to developers of the software applications, and
wherein at least a portion of the transaction processing circuit is implemented using a shared, scalable computing system, wherein a level of resources of the shared, scalable computing system requested for implementation of the transaction processing circuit is varied based on a volume of transactions processed by the transaction processing system.

13. The method of claim 12, wherein the payment system is implemented using a static computing resource.

14. The method of claim 12, wherein the transaction processing circuit comprises a master node configured to organize the transaction data into one or more transaction batches.

15. The method of claim 14, wherein the transaction processing circuit comprises multiple worker nodes configured to receive the transaction batches and applying the one or more business rules to the transaction data.

16. The method of claim 12, wherein the transaction data comprises purchase data received from an application catalog and payment data received from a payment provider, wherein the purchase data represents purchases made from the application catalog in relation to the one or more transactions, wherein the payment data represents payments received in relation to the one or more transactions, wherein applying the one or more business rules comprises confirming that the purchase data is consistent with the payment data.

17. The method of claim 12, further comprising receiving a report of fees paid by one or more of the developers from the payment system, wherein the payment system is configured to coordinate payment of membership fees from the developers.

18. One or more non-transitory computer-readable media configured to store machine-executable instructions that are executable by one or more processors to implement a method comprising:
receiving, at a transaction processing circuit, purchase data relating to one or more transactions for the purchase of software applications from an application store, the purchase data being received from a digital application catalog or store, the purchase data representing purchases made from the application catalog in relation to the one or more transactions, the transaction processing circuit being implemented using a shared, scalable computing system, wherein a level of resources of the shared, scalable computing system requested for implementation of the transaction processing circuit is varied based on a volume of transactions processed by the transaction processing system;
receiving, at the transaction processing circuit, payment data representing payments received in relation to the one or more transactions, the payment data being received from a payment provider that collects payments for the transactions;
grouping, using a master node of the transaction processing circuit, the one or more transactions into one or more transaction batches;
for each transaction batch, confirming, using one or more worker nodes of the transaction processing circuit, that the purchase data is consistent with the payment data, wherein the one or more worker nodes are implemented using resources of the shared, scalable computing system that are allocated based at least in part on a volume of transactions being processed by the transaction processing circuit; and
generating, using the transaction processing circuit, one or more transaction summary files,
wherein the transaction summary files are transmitted to a payment system configured to perform, based on the transaction summary files, at least one of recording revenue related to the transactions and causing payment to be distributed to developers of the software applications.

19. The one or more non-transitory computer-readable media of claim 18, wherein the transaction summary files comprise a revenue summary file, the revenue summary file including data representing revenue generated in connection with the transactions, wherein the revenue summary file is transmitted to a payment system configured to post revenue based on the revenue summary file.

20. The one or more non-transitory computer-readable media of claim 18, wherein the transaction summary files comprise a vendor payment summary file, the vendor payment summary file including data representing payment that should be made to one or more developers of the software applications in connection with the transactions, wherein the vendor payment summary file is transmitted to the payment system and the payment system is configured to arrange payment for the developers based on the vendor payment summary file.

* * * * *